US006173439B1

(12) United States Patent
Carlson et al.

(10) Patent No.: US 6,173,439 B1
(45) Date of Patent: Jan. 9, 2001

(54) INTERFACE MECHANISM AND METHOD FOR ACCESSING NON-OBJECT ORIENTED DATA FROM WITHIN AN OBJECT ORIENTED FRAMEWORK

(75) Inventors: Brent Allen Carlson; Timothy James Graser, both of Rochester, MN (US); Ulf Jesper Thomas Lindblom, Bromma (SE); Anders Magnus Nilsson, Hagan (NO); Torbjorn Pernbeck, Stockholm (SE)

(73) Assignee: International Business Machines Corporation, Armonk, NY (US)

( * ) Notice: Under 35 U.S.C. 154(b), the term of this patent shall be extended for 0 days.

(21) Appl. No.: 09/160,059

(22) Filed: Sep. 24, 1998

Related U.S. Application Data

(63) Continuation-in-part of application No. 09/038,024, filed on Mar. 11, 1998, now Pat. No. 6,106,569.

(51) Int. Cl.$^7$ .......................................................... G06F 9/45
(52) U.S. Cl. ................. 717/1; 717/10; 707/103; 707/104
(58) Field of Search ........................ 717/1, 10; 707/102, 707/103, 104

(56) References Cited

U.S. PATENT DOCUMENTS

| | | | |
|---|---|---|---|
| 5,235,701 | * | 8/1993 | Ohler et al. ............................... 707/1 |
| 5,475,817 | * | 12/1995 | Waldo et al. ......................... 709/303 |
| 5,581,765 | * | 12/1996 | Munroe et al. ...................... 709/107 |
| 5,590,327 | * | 12/1996 | Biliris et al. .......................... 709/100 |
| 5,732,263 | * | 3/1998 | Havens et al. ........................ 707/103 |
| 5,870,753 | * | 2/1999 | Chang et al. ......................... 707/103 |
| 5,878,411 | * | 3/1999 | Burroughs et al. ....................... 707/4 |
| 5,956,730 | * | 9/1999 | Burroughs et al. .................. 707/104 |
| 5,978,811 | * | 11/1999 | Smiley ................................. 707/103 |
| 5,987,423 | * | 11/1999 | Arnold et al. ......................... 705/14 |
| 6,018,743 | * | 1/2000 | Xu ........................................ 707/103 |
| 6,106,569 | * | 8/2000 | Bohrer et al. ............................ 717/1 |

OTHER PUBLICATIONS

Bohrer et al., "The San Francisco Project: An Object–Orietned Framework Approach to Building Business Applications," COMPSAC '97. Proceedings of The Twenty–First Annual International Computer Software and Applications Conference, Aug. 13–15, 1997, pp. 416–424.*

* cited by examiner

*Primary Examiner*—Kakali Chaki
*Assistant Examiner*—Tuan Q. Dam
(74) *Attorney, Agent, or Firm*—Martin & Associates, L.L.C.; Derek P. Martin

(57) ABSTRACT

In an object oriented computer system, an object oriented framework defines an interface mechanism that provides a common interface to a non-object oriented persistent datastore. This common interface can be customized by various types within the framework by effectively hiding attributes on the common interface that are not needed by a particular type. Attributes defined on the common interface may be accessed at any level in the framework through a process of delegation from one level to the next. In addition, one or more of these attributes on the common interface may be defined at various levels, which causes those attributes to be accessed at their respective levels instead of delegating to different levels.

25 Claims, 7 Drawing Sheets

INTERFACE MECHANISM AND METHOD FOR ACCESSING NON-OBJECT ORIENTED DATA FROM WITHIN AN OBJECT ORIENTED FRAMEWORK

REFERENCE TO PARENT APPLICATION

This application is a Continuation-In-Part of "A Method of Developing a Software System Using Object Oriented Technology", U.S. Ser. No. 09/038,024, filed Mar. 11, 1998, which is incorporated herein by reference now U.S. Pat. No. 6,106,569.

RELATED APPLICATION

This application is related to "Object Mechanism and Method that Creates Domain-Neutral Objects with Domain-Specific Extensions in an Appropriate Collection", U.S. Ser. No. 09/148,560, filed Sep. 4, 1998, which is incorporated herein by reference.

BACKGROUND OF THE INVENTION

1. Technical Field

This invention generally relates to object oriented programming and more specifically relates to a mechanism and method for storing and retrieving non-object oriented data from within an object oriented framework.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Many software applications need to operate on data that already exists, and need to store data for later use by another software application. A database is generally used to store persistent data, that is, data that survives beyond the life of a software process that may create, use, or modify the data. Databases are known in the art as persistent storage mechanisms (or simply, persistent stores). One common type of database is a relational database (RDB), which stores data in rows and columns of a table. Each column typically defines an attribute of interest that is stored in the database. Each row typically defines a "record", which is a single entry in the database that may contain data in each of the attribute fields, or columns. A database manager is typically provided in a relational database to store and retrieve data in the database. The data in a relational database table is referred to as "flat data", meaning that only the data is stored in the database, and the data does not have corresponding methods that may be invoked to access the data, as would be the case if the data were stored in an object in an object oriented persistent store.

Many computer systems today employ relational databases or other non-object oriented mechanisms for storing persistent data. Many of these computer systems run object-oriented software that needs to access data in non-object oriented persistent datastores. Generally speaking, an interface must be custom-designed to allow an object oriented application to access non-object oriented data in a persistent datastore such as a relational database. This problem is aggravated by the fact that the same data may need to be accessed at different levels in the software application. For example, in an order processing system, we assume the orders and all detail information relating to each order are stored in a persistent store. The quantity of an order item may need to be accessed at different levels in the order processing system (i.e., by different order types or order detail types). For example, the quantity will need to be known to calculate the price, to calculate shipping expenses, to determine whether there is sufficient inventory to satisfy the order, etc. Rather than custom-designing an interface mechanism for each variation (or "type") of order or order detail in the order process to access the needed data, it would be preferable to provide some type of common interface that could be customized as required for each order type. This approach would be particularly useful in object oriented frameworks.

Frameworks are relatively recent developments in object oriented programming that provide a group of pre-packaged classes and class relationships that are designed to help a user easily extend the framework to write a particular software program, such as a software application. Frameworks typically define certain core functions that cannot be changed by a programmer using the framework, and allow the programmer to extend the framework at defined extension points to generate a custom software application in much less time than coding the software application from scratch. In other words, a programmer could use an order processing framework to generate an order processing software application without having to program the code that represents the core functions of the framework. However, there is no uniform and consistent mechanism for providing access to non-object oriented data from within an object oriented framework, especially when the data needs to be accessed by different types of items in the framework. Without a mechanism for allowing an object oriented framework to access non-object oriented data in a persistent data store by different types of items in the framework, the computer industry will continue to suffer from object oriented frameworks that do not provide the desired power and flexibility, and that require that custom code be written to provide the needed interfaces.

DISCLOSURE OF INVENTION

In an object oriented computer system, an object oriented framework defines an interface mechanism that provides a common interface to a non-object oriented persistent datastore. This common interface can be customized by various types within the framework by effectively hiding attributes on the common interface that are not needed by a particular type. Attributes defined on the common interface may be accessed at any level in the framework through a process of delegation from one level to the next. In addition, one or more of these attributes on the common interface may be defined at various levels, which causes those attributes to be accessed at their respective levels instead of delegating to different levels.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
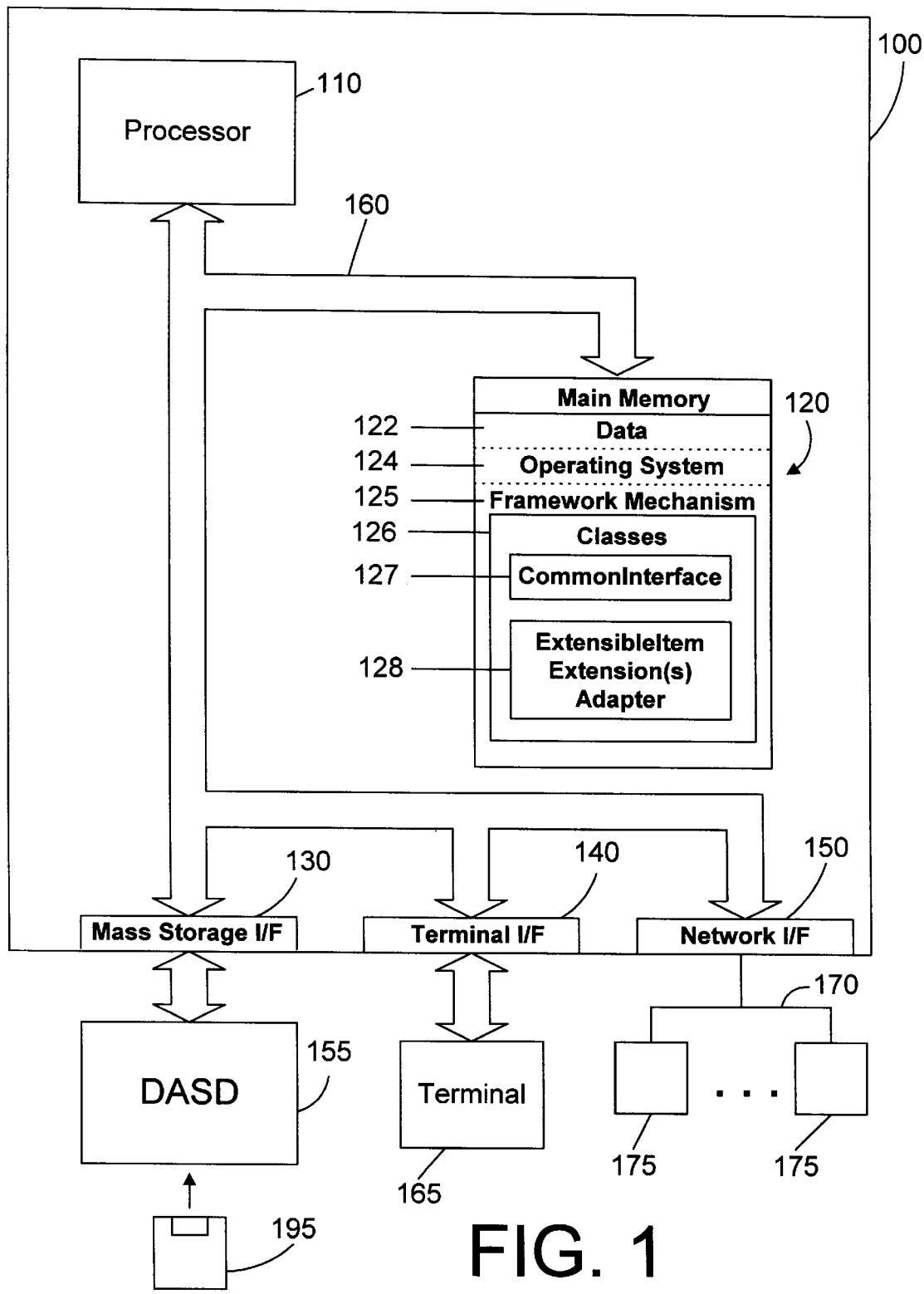
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

IBM's San Francisco Framework

IBM introduced a framework product known as "San Francisco" that provides a framework for programming business applications, such as a general ledger or order processing application. San Francisco provides a set of base services such as persistence and transaction support as well as a set of common business objects such as currency and business partner. Above the base layer, San Francisco provides frameworks that define the basis of an application such as a general ledger or order management with well-defined extension points. A user may take advantage of the power and flexibility of San Francisco by providing user-defined extensions that customize San Francisco for a particular application. San Francisco thus provides a "short cut" to custom programming an entire application by providing pre-packaged code that is easily extended by a user to provide a custom application.

Extensible Items within IBM's San Francisco Framework

An important concept embodied in the San Francisco framework is the ability to separate mechanisms in the framework from domain-specific behavior. This is accomplished using dynamic run-time extensions that may be added to or deleted from an object to dynamically change the object's behavior. The extensions are objects that define interfaces that the extended object supports. Thus, the addition of an extension causes an object to support additional methods defined by those extensions, and the deletion of an extension causes an object to lose the support for the methods defined by the extension. An object may have a primary extension, and one or more additional extensions. An object with a primary extension logically becomes an object of the type defined by the primary extension. Thus, if an object has a primary extension OrderDetail, the object logically appears to be a member of the OrderDetail class. This ability to dynamically modify the behavior of objects at run-time is one of the powerful concepts supported in the San Francisco framework.

Figure 2:
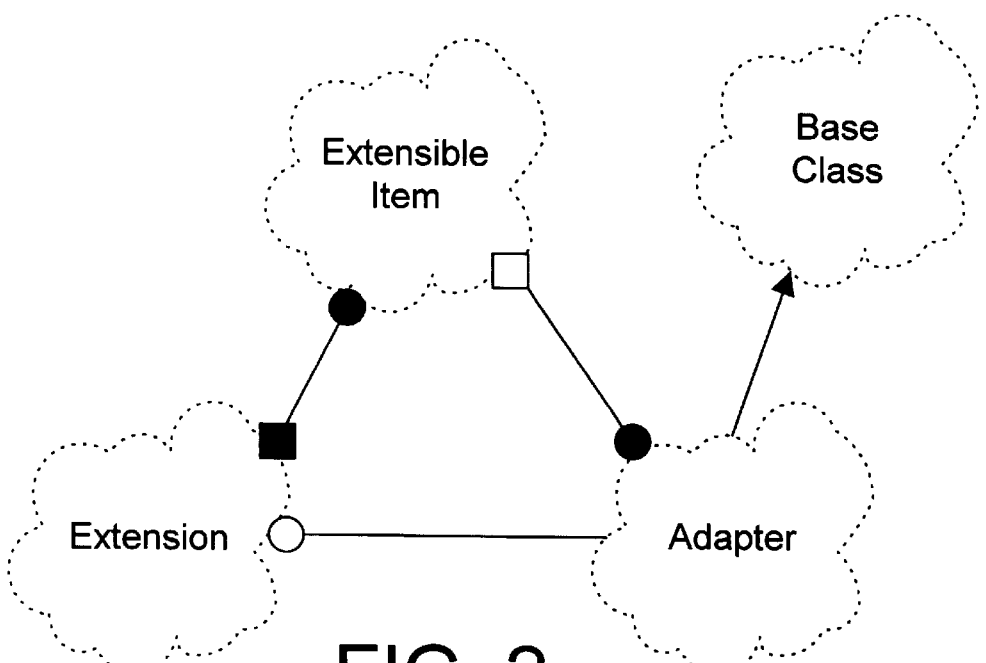
FIG. 2 is a class diagram of an extensible item and its related classes.

The class diagram of FIG. 2 illustrates the concept of dynamic run-time extensions in the San Francisco framework. An ExtensibleItem class represents a pure mechanism that is domain-neutral, i.e., that has no information (or need of information) that pertains to the specific domain in which an instance of ExtensibleItem is used. The ExtensibleItem class has a "has" relationship with an Extension class, which defines domain-specific run-time extensions that add functionality to an ExtensibleItem object that is required by the particular domain. This "has" relationship represents that each ExtensibleItem object may "own" one or more Extension objects. The Extension class has the ability to create or delete one or more adapter objects that are instances of an Adapter class. The Extension class has a "uses" relationship with the Adapter class, while the Adapter class has a "has" relationship with the ExtensibleItem class. The Adapter class inherits from a BaseClass that defines domain-specific behavior. The BaseClass defines a formal interface for the domain behavior that objects of the Extension class add to an ExtensibleItem object. The Adapter class is provided to allow an ExtensibleItem object owning an object of the given Extension class to be treated as a true instance of the BaseClass by making public methods implemented by the associated extension. Only methods defined by the Adapter class can be invoked.

Figure 3:
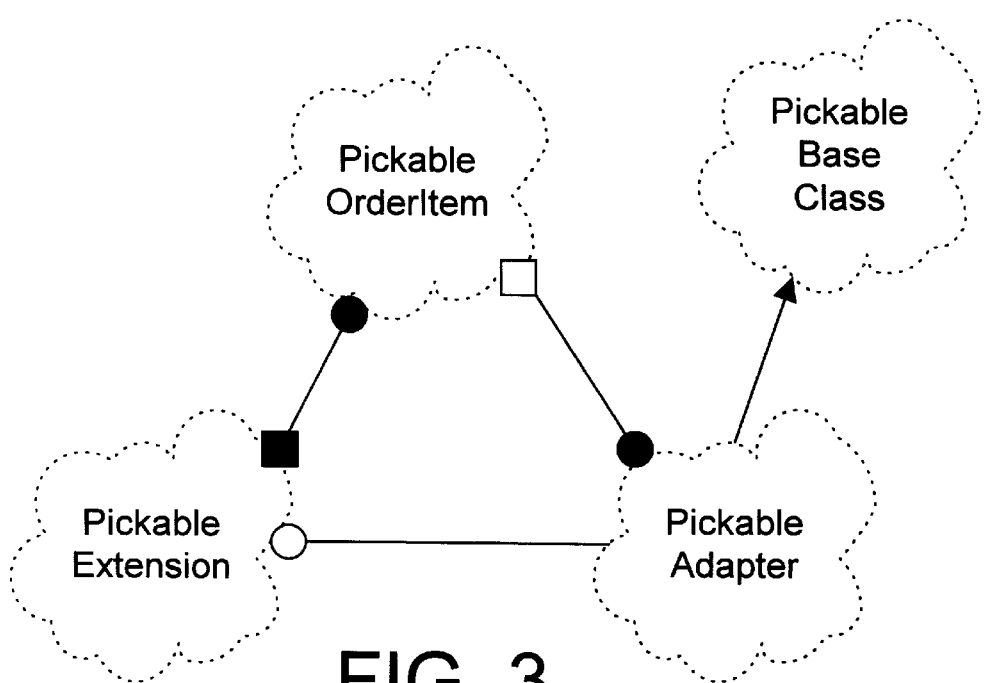
FIG. 3 is a class diagram of one specific example of an extensible item.

A specific example helps to illustrate the concepts of domain-specific extensions to a domain-neutral object. Let's assume there is a need for a "pickable" order item. Referring to FIG. 3, a PickableOrderItem class represents a domain-neutral extensible item, and includes an instance of a PickableExtension class, which extends the PickableOrderItem for use in a specific domain that requires objects that are pickable. A PickableAdapter class has a reference to the PickableOrderItem class, and supports the interface of the PickableBaseClass. The class configuration of FIG. 2, as illustrated in the specific example of FIG. 3, allows extensions to be dynamically added to and deleted from an extensible item object as the desired function of the object changes.

Figure 4:
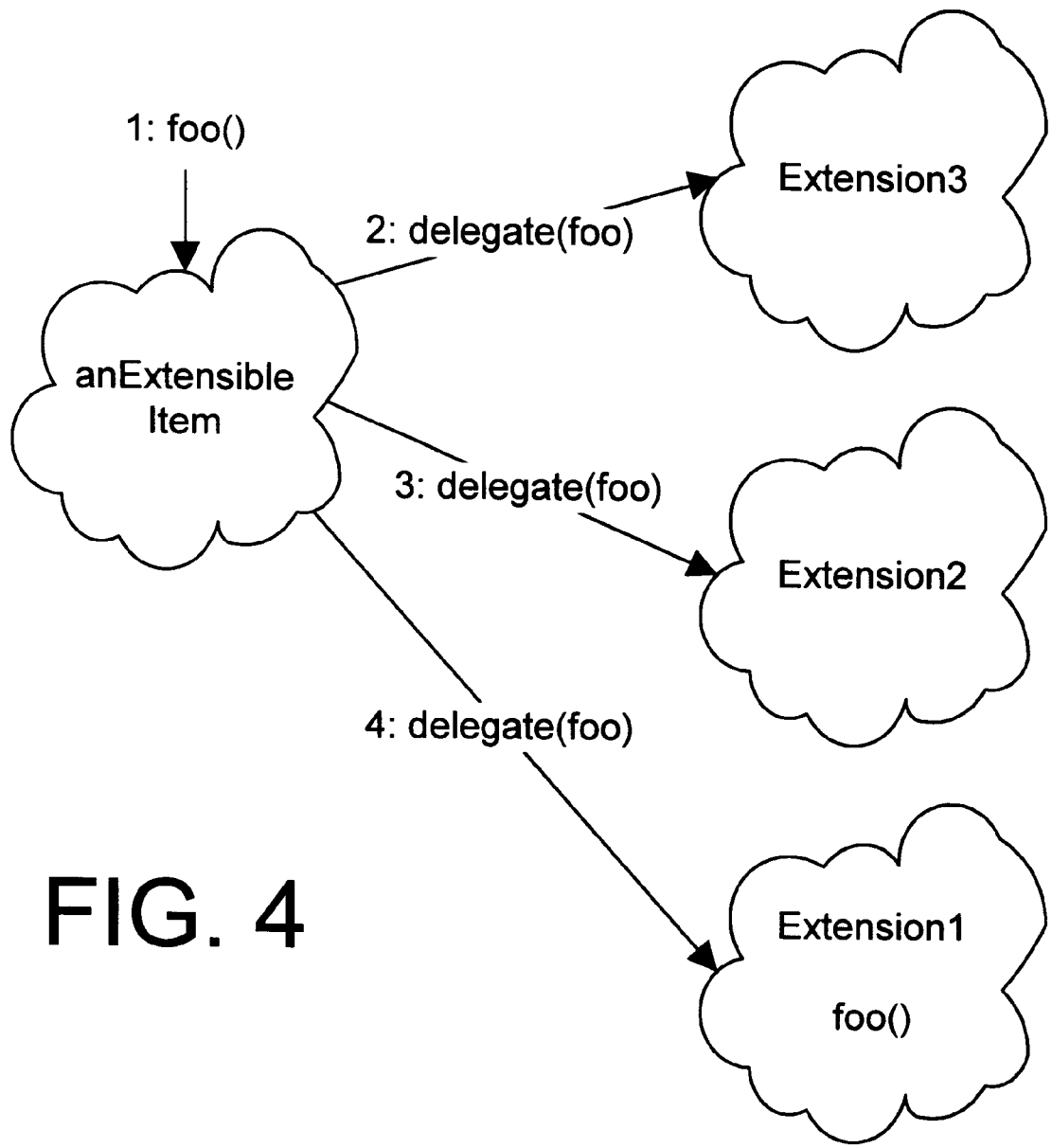
FIG. 4 is an object diagram illustrating the delegation of method calls to extension objects.

An instance of the ExtensibleItem class can service method calls in a number of different ways. Referring to FIG. 4, an instance anExtensibleItem has three associated extensions, Extension3, Extension2, and Extension1. One way for anExtensibleItem to service a method call is to determine which extension can handle the method call, progressing from the newest (Extension3) to the oldest (Extension1). For example, we assume that Extension1 supports a method called "foo", and that "foo" is invoked on anExtensibleItem (step 1). The anExtensibleItem object first delegates the "foo" method to Extension3 (step 2). Extension3 does not support the method, so anExtensibleItem delegates the call to "foo" to the next extension, Extension2 (step 3). Extension2 does not support the "foo" method, so anExtensibleItem delegates the call to "foo" to Extension1 (step 4). Extension1 supports "foo", so Extension1 executes its "foo" method in response to anExtensibleItem delegating "foo" to Extension1 in step 4. Note that the first extension to support the "foo" method will execute its "foo", and other implementations of "foo" in older extensions are therefore not available. This is one way of hiding a method on existing extensions, by providing a newer extension that supports the method. In the alternative, an extension may change itself to fail when a specific method is requested, thereby hiding its own implementation of that method.

As the behavior of an ExtensibleItem is changed by adding or deleting extensions, the ExtensibleItem may have to interrogate several objects to determine the functions that its interface supports, as shown in FIG. 4. If a method is not supported, the ExtensibleItem may spend a significant amount of processing time to make this determination. Likewise, if a method is implemented in an older interface, the ExtensibleItem may have to unsuccessfully interrogate several extensions before finding one that supports the called method. To improve performance, a Dynamic Virtual Function Table (DVFT) is used to cache the interface information on the ExtensibleItem in a dynamic way. Thus, when a method is invoked, the ExtensibleItem can determine from its Dynamic Virtual Function Table whether the method is supported, and if so, by what extension. The Dynamic Virtual Function Table thus improves system performance by caching interface information in the ExtensibleItem itself.

The information in the Dynamic Virtual Function Table may be maintained either as extensions are added to or removed from the ExtensibleItem, or may be built as the extensions are used. In the latter case, as a method call is delegated to an extension for the first time, its methods are added to the Dynamic Virtual Function Table. This solution is dynamic by maintaining cached information as the extensions are added and removed from the ExtensibleItem.

Extensible items thus provide a powerful and dynamic way to change the interface for an object at run-time so the object can acquire and tailor its domain-specific behavior as required. The concept of extensible items discussed above is the foundation upon which the present invention is built.

2. Detailed Description

According to a preferred embodiment of the present invention, a mechanism and method provide a common interface for accessing non-object oriented data from within an object oriented framework. The interface may be customized for each type defined by the framework as required.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, and an object oriented framework mechanism 125 in accordance with the preferred embodiments. Framework 125 includes multiple pre-defined classes 126, which include a common interface class 127 and a collection of classes that comprise a hierarchical extensible item 128. Each hierarchical extensible item 128 includes an ExtensibleItem, one or more Extensions, and an Adapter, as shown in FIG. 1 and described above with reference to FIG. 2. The hierarchical extensible item is described in more detail below. While the common interface class 127 is shown in FIG. 1 as residing within the framework 125 according to the preferred embodiment, it is equally within the scope of the invention to have the common interface class 127 provided separate from the framework 125.

The common interface class 127 within framework 125 defines an interface for mapping data in the object oriented world to data stored in a non-object oriented persistent store, such as a relational database. The common interface class suitably defines an attribute for each category of data in the persistent store. For example, in the case of a relational database table, the common interface class defines attributes that each correspond to a column in the relational database table. The common interface class also defines methods that access these various attributes by storing and retrieving data in the relational database table.

The hierarchical extensible item 128 via its contained primary extension may customize the interface defined by the common interface class by hiding one or more of the attributes defined on the common interface class, as required by the particular order type in the framework. For example, an order processing framework may define a full sales order and a direct sales order. For a full sales order, where a company bills their customers after shipping the goods, the order processing may be represented at a high level by the following sequence of processes: 1) generate order; 2) pick order; 3) ship order; 4) generate invoice; and 5) confirm payment. For a direct sales order, such as a retail sale, the customer directly selects the items from stock, so the steps of picking and shipping the order are not required. Let's assume that the common interface class defines the attribute RequestedDeliveryTime. This attribute is needed by the full sales order, but is not needed by the direct sales order. This attribute could therefore be hidden by the direct sales order by only defining the needed methods on the extension for the full sales order type. In this manner, each order type can appear to have a custom interface, but in reality each interface is a subset of the common interface, and the methods on the common interface are ultimately invoked to access the data in the relational database.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, and framework mechanism 125 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/ Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 5:
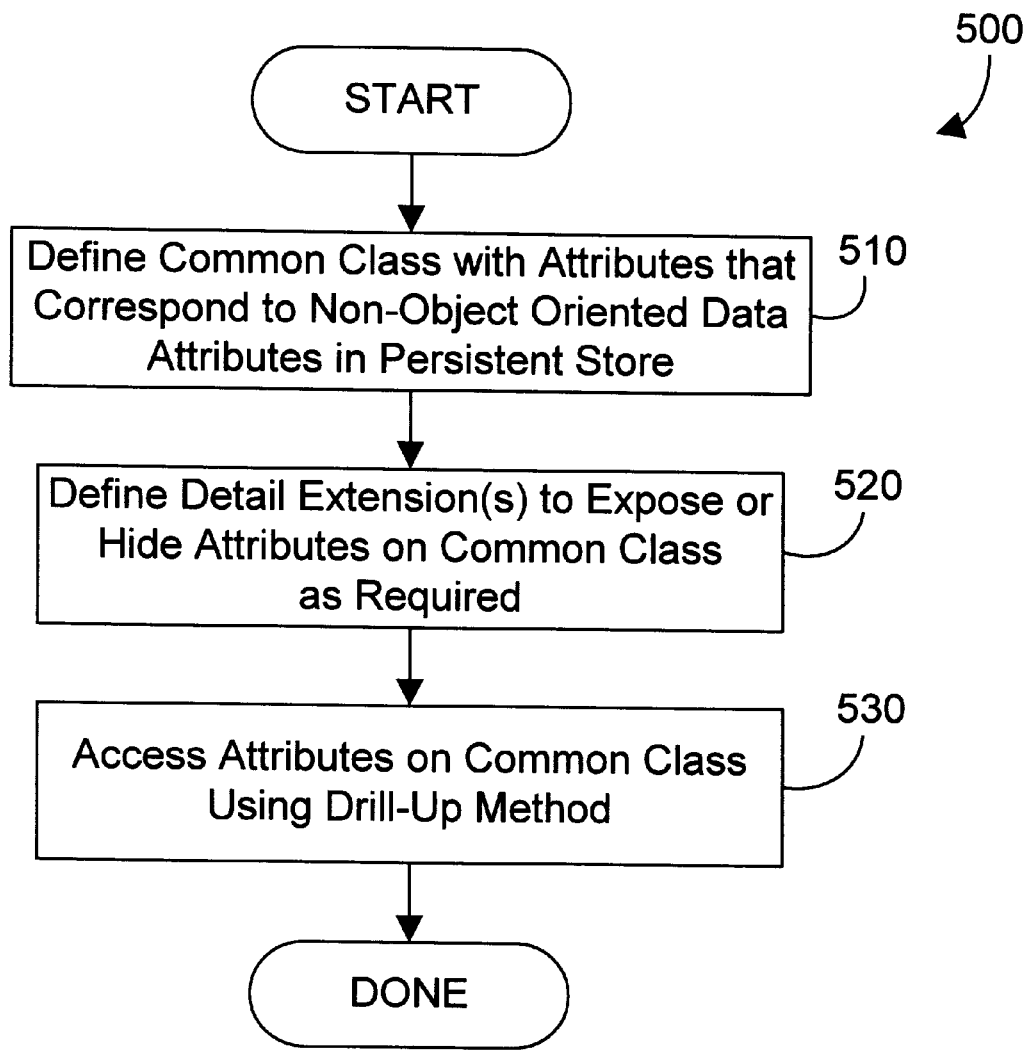
FIG. 5 is a flow diagram showing the steps in defining an interface in an object oriented framework mechanism that allows the framework mechanism to access non-object oriented data in a persistent data store, and shows the step of accessing the attributes corresponding to the non-object oriented data.

Referring to FIG. 5, a method 500 for providing a common interface for non-object oriented data for various types within a framework begins by defining a common interface class (e.g., class 127 of FIG. 1) with attributes that correspond to non-object oriented data attributes in a persistent store (step 510). Next, detail extensions are defined to expose or hide the attributes on the common interface class as required (step 520) to provide a custom interface for that detail level. Finally, method 500 accesses the attributes on the common interface class using a drill-up method of delegation along different levels of an object hierarchy (step 530), as described in more detail below.

Figure 6:
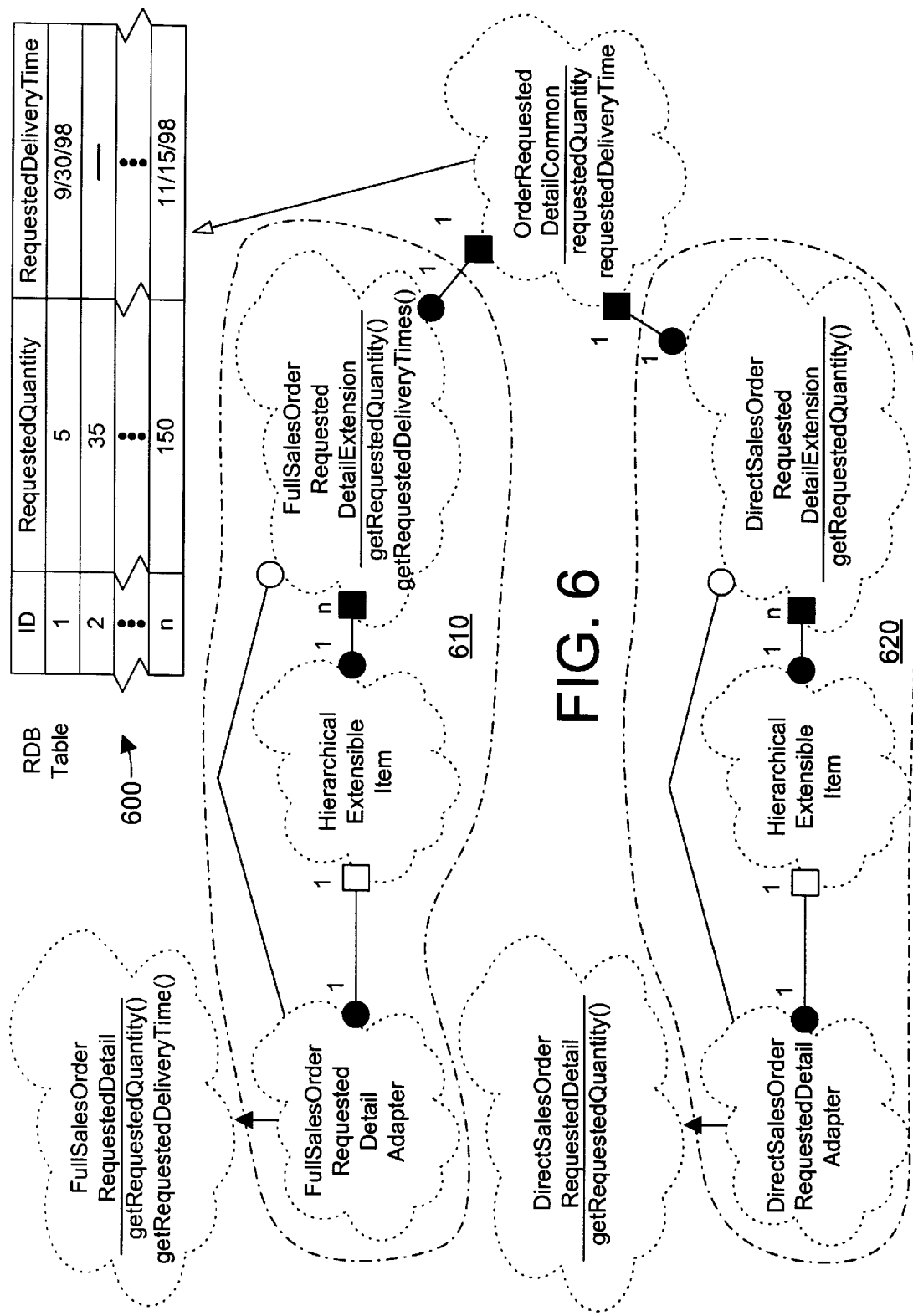
FIG. 6 is a class diagram showing how a common interface class can provide an interface to non-object oriented data in a persistent data store while extensions that contain the common interface class can contain customized interfaces that allow some of the attributes on the common interface class to be hidden.

Referring to FIG. 6, a class diagram of an object oriented implementation in accordance with the preferred embodiments defines a number of classes and class relationships that collectively comprise a means for providing a common interface for accessing non-object oriented data from within an object oriented framework. We assume for the example of FIG. 6 that two different types of sales orders are defined within an order processing framework. The first is a full sales order, and the second is a direct sales order. A common interface class defines the required attributes that correspond to data of interest in the non-object oriented datastore. For the specific example of FIG. 6, the OrderRequestedDetail- Common class is the common interface class for all classes at the order requested detail level to use for accessing data in a relational database (RDB) table 600. The table 600 in the example includes two data columns, RequestedQuantity and RequestedDeliveryTime. These columns in the RDB table 600 have corresponding attributes, requestedQuantity and requestedDeliveryTime on the OrderRequestedDetail- Common class. Of course, the OrderRequestedDetailCommon class also defines methods getRequestedQuantity( ) and getRequestedDeliveryTime( ) (not shown) to access these attributes. The combination of attributes and methods that access corresponding attributes on the RDB table 600 comprise the interface between the framework and the non-object oriented data in the table 600. Mapping the object oriented methods on the common interface to the non-object oriented data in table 600 may be done using any suitable mapping mechanism and method. One suitable mapping mechanism and method that could be used is disclosed in U.S. patent application Ser. No. 08/978,656, "Schema Mapping to a Legacy Table with Primary and Foreign Key Support", filed Nov. 26, 1997, which is incorporated herein by reference.

To use the interface between the framework and the non-object oriented data, a detail implements the appropriate methods on its interface to provide a custom interface, as appropriate. For example, as shown in FIG. 6, a FullSalesOrderRequestedDetail class is defined with both the getRequestedQuantity( ) and the getRequestedDeliveryTime( ) methods that are defined on the OrderRequestedDetailCommon class. A full sales order in this context is defined to be a sales order that contains many of the traditional order processing steps, and that specifically use the requested quantity of an order detail and the requested delivery time for an order detail. The FullSalesOrderRequestedDetail is a base class that provides domain information for processing the order requested detail. FullSalesOrderRequestedDetailAdapter is the adapter for a hierarchical extensible item 610, which also includes the HierarchicalExtensibleItem class and the FullSalesOrderRequestedDetailExtension class. These three classes have the same relationship as shown in FIG. 2 for a generic extensible item. The FullSalesOrderRequestedDetailExtension class defines an extension that dynamically extends the behavior of the hierarchical extensible item 610. The extension contains the OrderRequestedDetailCommon class to provide a suitable interface to the non-object oriented data residing in table 600. The specific extension FullSalesOrderRequestedDetailExtension defines the methods getRequestedQuantity( ) and getRequestedDeliveryTime( ), because both quantity and delivery time is relevant information for a full sales order. The FullSalesOrderRequestedDetailExtension therefore has both of the relevant methods defined on the common interface class for accessing data in table 600.

A second type of order is a direct sales order. We assume that a direct sales order is an order that takes place directly with a buyer, such as when a retail customer desires to purchase an item on a store shelf. As for the case with the full sales order described above, the DirectSalesOrderRequestedDetailAdapter class is a subclass of the DirectSalesOrderRequestedDetail class, which contains domain-specific information for the direct sales orders, and defines a single method getRequestedQuantity( ). This adapter is part of a hierarchical extensible item 620 that includes the DirectSalesOrderRequestedDetailExtensibleItem class and the DirectSalesOrderRequestedDetailExtension class. Both hierarchical extensible items 610 and 620 are suitable examples of hierarchical extensible item 128 shown in FIG. 1. In a direct sales scenario, the requested quantity is still needed, but the requested delivery time has no relevance, because in a direct sales situation, the delivery time is immediate when a customer places an order by buying an item. The DirectSalesOrderRequestedDetailExtension is an extension that provides, in conjunction with the OrderRequestedDetailCommon class, a custom interface for the direct order that only includes the getRequestedQuantity( ) method. The getRequestedDeliveryTime( ) method on the common interface class is not defined on the DirectSalesOrderRequestedDetailExtension, so this attribute on the common interface class is effectively hidden from the direct sales order. The extensions thus provide a mechanism for customizing the interface by defining the attributes on the common interface class that are of interest, and by hiding the attributes on the common interface class that are not of interest by not defining methods to access those attributes. In this manner a flexible mechanism is provided that provides a single interface through the common interface class to non-object oriented data from a variety of different details and potentially detail types in the framework, while preserving a common persistent storage mechanism that allows all data in the persistent store to be accessed by non-object oriented mechanisms, such as a report generator or mechanism that reviews order details for the purpose of performing statistical process control.

Table 600 as shown in FIG. 6 includes entries 1 and n that specify both a RequestedQuantity and a RequestedDeliveryTime, and also includes an entry 2 that only specifies a RequestedQuantity, while the corresponding RequestedDeliveryTime is a null value represented by a dash. This mix of entries in table 600 shows that table 600 may contain data relating to both FullSalesOrders and DirectSalesOrders, and that the custom interfaces provided by FullSalesOrderRequestedDetailExtension and DirectSalesOrderRequestedDetailExtension can access their respective data types in the same table 600.

Figure 7:
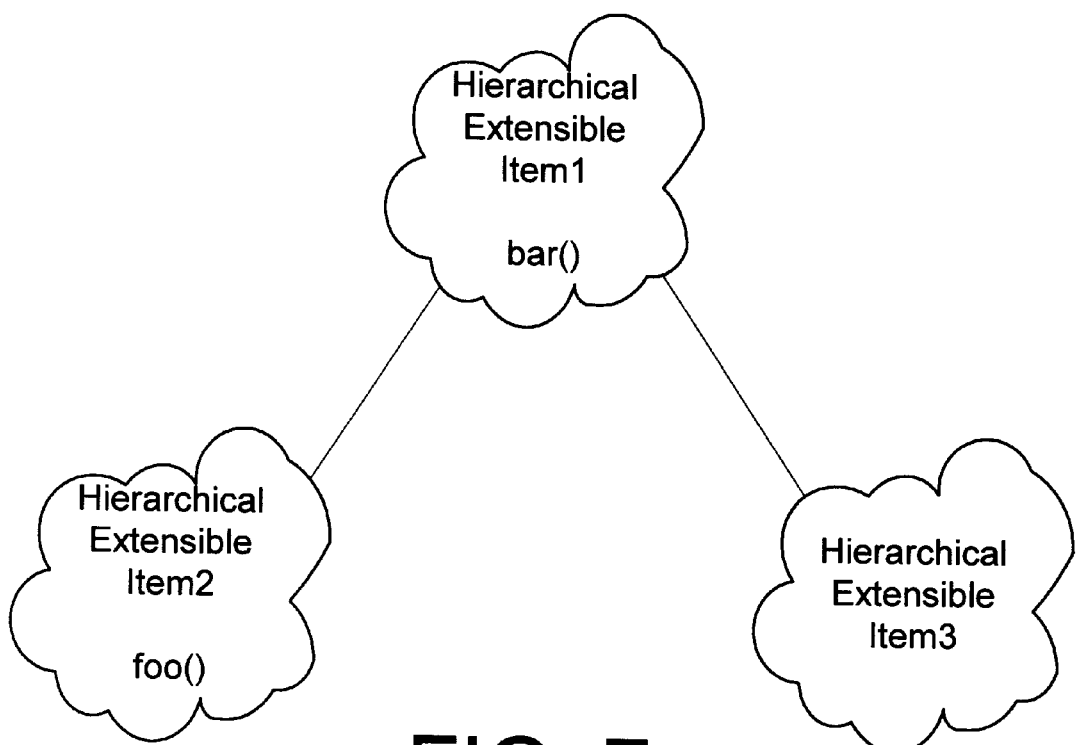
FIG. 7 is an object tree for illustrating the delegation of method calls to parent and children objects in an object tree in accordance with the present invention.

Another aspect of the preferred embodiments is the ability to delegate method calls to objects that are above or below the current object in some defined object tree. Thus, if an ExtensibleItem object is part of a tree structure of objects, where it is attached to other ExtensibleItem objects as a parent and/or a child, the method call on one ExtensibleItem object may be delegated either upwards or downwards in the tree structure. For example, referring to FIG. 7, a very simple tree structure is provided to illustrate the delegation of method calls from one object in a tree structure to another. We assume that a class HierarchicalExtensibleItem is a subclass of ExtensibleItem of FIG. 2 and that enhances ExtensibleItem by adding behavior to explicitly allow invoking methods in either a "drill up" or "drill down" fashion. HierarchicalExtensibleItem1 in FIG. 7 is an instance of the HierarchicalExtensibleItem class, and is at the top level of the tree, with two children objects HierarchicalExtensibleItem2 and HierarchicalExtensibleItem3 that are also instances of the HierarchicalExtensibleItem class. We assume that HierarchicalExtensibleItem1 supports the method "bar", and that HierarchicalExtensibleItem2 supports the method "foo". This means that these objects have one or more extensions that support these methods. In the case of "drill up", either method "foo" or "bar" could be invoked on HierarchicalExtensibleItem2. The invocation of the "foo" method on HierarchicalExtensibleItem2 delegates to the "foo" method on HierarchicalExtensibleItem2, while the invocation of "bar" delegates the "bar" up the tree (drill up) to HierarchicalExtensibleItem1. Invoking "foo" on HierarchicalExtensibleItem1 or HierarchicalExtensibleItem3 using "drill up" results in an error. When invoking a method using "drill down", if the method is found on a given HierarchicalExtensibleItem, the delegation will be to that method only, otherwise it will be invoked in "drill down" fashion (which may involve recursion) on all children of the given HierarchicalExtensibleItem, accumulating the results of the multiple method calls, if necessary. Thus, if "bar" is invoked on HierarchicalExtensibleItem1 using "drill down", it would delegate to the "bar" method on HierarchicalExtensibleItem1 and stop there. However, if "foo" were called on HierarchicalExtensibleItem1 using "drill down", the call would be delegated to "foo" on HierarchicalExtensibleItem2 and would then continue on to HierarchicalExtensibleItem3 (which would have no effect in the specific example of FIG. 7), and stop there. This concept of upwards and downwards delegation of method calls can be extended indefinitely throughout a tree structure of ExtensibleItems.

Figure 8:
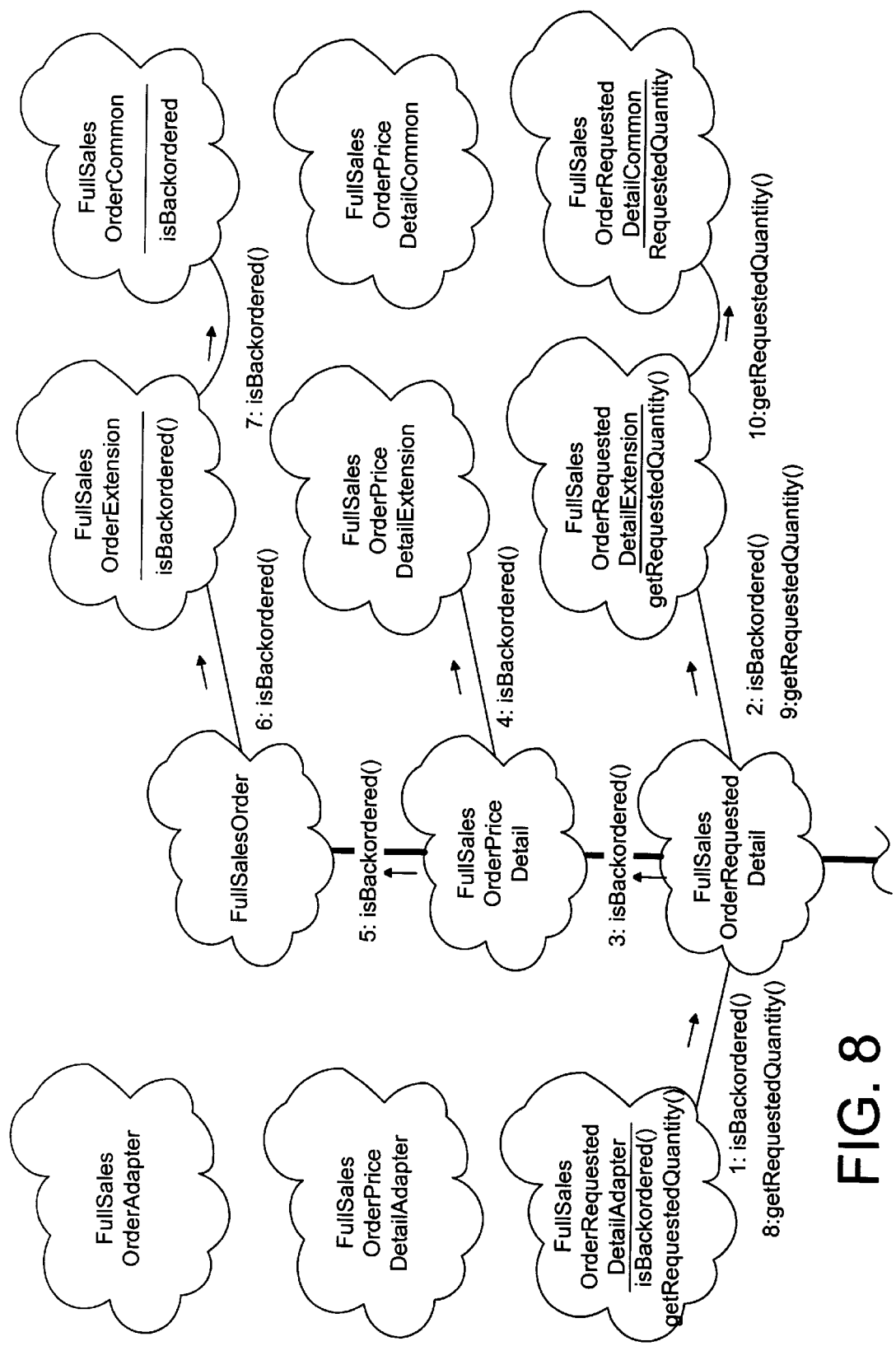
FIG. 8 is an object interaction diagram showing how the delegation of method calls across levels in an object tree may be used in accordance with the preferred embodiments.

The common interface class 127 of FIG. 1 provides advantages by defining attributes in one place in an object tree that can be accessed as required by objects at different levels in the object tree using the drill-up techniques discussed above. For example, referring to FIG. 8, a portion of an order object tree is defined that includes a FullSalesOrder object, a FullSalesOrderPriceDetail object, and a FullSalesOrderRequestedDetail object. The FullSalesOrder object is the top level object that defines an order, and the FullSalesOrderPriceDetail object and FullSalesOrderRequestedDetail object are lower levels in the object tree, as shown in FIG. 8. We assume for this example that the FullSalesOrder object has its corresponding FullSalesOrderAdapter and FullSalesOrderExtension objects, which collectively comprise the full sales order hierarchical extensible item. In similar fashion, the FullSalesOrderPriceDetail and FullSalesOrderRequestedDetail have their associated adapter and extension objects as well. Each extension object has a corresponding common object that is an instance of the a CommonInterface class, discussed above. For this example, we assume that an attribute isBackordered is defined on the FullSalesOrderCommon object that indicates whether an order is backordered or not. We also assume that the methods isBackordered( ) and getRequestedQuantity( ) are defined on the FullSalesOrderRequestedDetailAdapter object.

We now assume that a client wants to determine if the order is backordered, so it invokes the isBackordered( ) method on the FullSalesOrderRequestedDetailAdapter object, which delegates this method call to its corresponding FullSalesOrderRequestedDetail object (step 1). This method call is delegated to one or more of the object's extensions (step 2), as described in reference to FIG. 4. Because this method is not defined on the FullSalesOrderRequestedDetailExtension, the FullSalesOrderRequestedDetail object then invokes the isBackordered( ) method on the next higher object in the object tree, the FullSalesOrderPriceDetail object (step 3). The FullSalesOrderPriceDetail object delegates this method call to its extension (step 4), which also does not implement this method. This causes the FullSalesOrderPriceDetail object to invoke the isBackordered( ) method on the FullSalesOrder object (step 5). The FullSalesOrder object delegates this method call to its FullSalesOrderExtension object (step 6), which implements the isBackordered( ) method. This method causes the isBackordered( ) method to be invoked on the FullSalesOrderCommon class (step 7), which contains the isBackordered attribute. A boolean value representing whether or not the order is backordered is then returned to the FullSalesOrderRequestedDetailAdapter object.

Next, we assume that a client invokes the getRequestedQuantity( ) method on the FullSalesOrderRequestedDetailAdapter object (step 8). This method call is delegated to the appropriate extension in step 9, which does implement this method. Because the getRequestedQuantity( ) method is implemented on the FullSalesOrderRequestedDetailExtension object, invoking this method results on the FullSalesOrderRequestedDetailExtension invoking the getRequestedQuantity( ) method on its common class (step 10), rather than drilling up the object tree to find an implementation of the method. This feature allows an attribute and supporting methods to be defined at any suitable level in an object tree structure, and the drill-up mechanism will seek out the lowest level where the method is implemented. Of course, alternative algorithms and parameters might be used to bypass some methods in the object tree in favor of methods defined at other levels. In addition, while the specific example shown in FIG. 8 illustrates drilling up an object tree, drill-down techniques are also expressly encompassed within the scope of the preferred embodiments herein.

The preferred embodiments herein disclose a way for an object oriented framework to provide a common interface to non-object oriented data along with the capability of customizing the interface to accommodate different detail types in the framework. In addition, a mechanism allows attributes to be defined on a particular object in an object tree, with method calls at different levels being delegated to the defined method calls so an attribute may reside in one object yet may be accessed by objects at different levels in the objet tree. These and other features are expressly within the scope of the preferred embodiments disclosed herein.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the invention is described herein with specific reference to an order processing framework and corresponding classes, one skilled in the art will appreciate that these examples are given by way of illustrating the concepts of the invention, and the present invention is not limited to an order processing framework. Virtually any type of framework may define an interface mechanism using the concepts taught herein.

We claim:

1. An apparatus comprising:
   at least one processor;
   a memory coupled to the at least one processor;
   an object oriented framework mechanism residing in the memory, the object oriented framework mechanism including an interface mechanism that defines a plurality of attributes corresponding to a plurality of stored data in a non-object oriented persistent datastore, the interface mechanism further defining a plurality of methods to access the plurality of stored data, the framework mechanism further including at least one user-defined extension that references the interface mechanism and that provides a plurality of methods to access the plurality of stored data by delegation to the plurality of methods on the interface mechanism.

2. The apparatus of claim 1 wherein the framework mechanism further includes at least one extensible item that may be dynamically extended by adding at least one extension that defines domain-specific behavior for the corresponding extensible item.

3. An apparatus comprising:
   at least one processor;
   a memory coupled to the at least one processor;
   an object oriented framework mechanism residing in the memory, the object oriented framework mechanism including an interface mechanism that defines a plurality of attributes corresponding to a plurality of stored data in a non-object oriented persistent datastore, the interface mechanism further defining a plurality of methods to access the plurality of stored data, the framework mechanism further including an adapter that provides an interface that defines a plurality of methods to access the plurality of attributes on the interface mechanism by delegating the plurality of methods on the adapter to the plurality of methods on the interface mechanism.

4. The apparatus of claim 3 wherein the framework mechanism further includes at least one extensible item that may be dynamically extended by adding at least one extension that defines domain-specific behavior for the corresponding extensible item.

5. An apparatus comprising:
   at least one processor;
   a memory coupled to the at least one processor;
   an object oriented framework mechanism residing in the memory, the object oriented framework mechanism including an interface mechanism that defines a plurality of attributes corresponding to a plurality of stored data in a non-object oriented persistent datastore, the interface mechanism further defining a plurality of methods to access the plurality of stored data, the framework mechanism further including a mechanism for invoking a method on an object at a different level in the framework mechanism if no object at the current level implements the method.

6. The apparatus of claim 5 wherein the framework mechanism further includes at least one extensible item that may be dynamically extended by adding at least one extension that defines domain-specific behavior for the corresponding extensible item.

7. An apparatus comprising:

at least one processor;

a memory coupled to the at least one processor;

an object oriented framework mechanism residing in the memory, the object oriented framework mechanism including:

a common interface defining at least one attribute corresponding to a plurality of data stored in a non-object oriented persistent datastore;

at least one extensible item that may be dynamically extended by adding at least one extension that defines domain-specific behavior for the corresponding extensible item;

at least one user-defined extension to the extensible item that references the common interface and provides a plurality of methods to access the at least one attribute on the common interface; and an adapter corresponding to the user-defined extension, the adapter providing an interface that define a plurality of methods to access the at least one attribute on the common interface by delegating the plurality of methods to the plurality of methods on the extension.

8. The apparatus of claim 7 wherein the extension defines a plurality of methods that access less than all of the attributes on the common interface, thereby hiding the attributes on the common interface that do not have corresponding methods defined on the extension.

9. A method for accessing non-object oriented data from within an object oriented framework the method comprising the steps of:

providing a common interface within the framework that defines a plurality of attributes that correspond to a plurality of non-object oriented data, the common interface defining an interface for accessing the plurality of attributes for multiple types in the framework;

providing an extension class that implements at least one method to access at least one of the plurality of attributes, the extension class hiding any attribute on the common interface that does not have a corresponding method defined on the extension class for accessing the attribute; and accessing the plurality of attributes on the common interface by delegating a method call on a first object to a second object at a different level than the first object in an object tree that includes the first and second objects.

10. A method for accessing non-object oriented data from within an object oriented framework, the method comprising the steps of:

providing a common interface within the framework that defines a plurality of attributes that correspond to a plurality of non-object oriented data, the common interface defining an interface for accessing the plurality of attributes for multiple types in the framework;

providing an extension class that implements at least one method to access at least one of the plurality of attributes, the extension class hiding any attribute on the common interface that does not have a corresponding method defined on the extension class for accessing the attribute;

providing at least one extensible item that may be dynamically extended by adding an instance of the extension class that defines domain-specific behavior for the corresponding extensible item;

providing at least one user-defined extension to the extensible item that references the common interface and providing a plurality of methods to access the plurality of attributes on the common interface; and providing an adapter corresponding to the user-defined extension, the adapter providing an interface that defines a plurality of methods to access the plurality of attributes on the common interface by delegating the plurality of methods to the plurality of methods on the extension.

11. A program product comprising:

an object oriented framework mechanism including an interface mechanism that defines a plurality of attributes corresponding to a plurality of stored data in a non-object oriented persistent datastore, the interface mechanism further defining a plurality of methods to access the plurality of stored data, the framework mechanism further including at least one user-defined extension that references the interface mechanism and that provides a plurality of methods to access the plurality of stored data by delegation to the plurality of methods on the interface mechanism; and signal bearing media bearing the framework mechanism.

12. The program product of claim 11 wherein the signal bearing media comprises recordable media.

13. The program product of claim 11 wherein the signal bearing media comprises transmission media.

14. The program product of claim 11 wherein the framework mechanism further includes at least one extensible item that may be dynamically extended by adding at least one extension that defines domain-specific behavior for the corresponding extensible item.

15. A program product comprising:

an object oriented framework mechanism including an interface mechanism that defines a plurality of attributes corresponding to a plurality of stored data in a non-object oriented persistent datastore, the interface mechanism further defining a plurality of methods to access the plurality of stored data, the framework mechanism further including an adapter that provides an interface that defines a plurality of methods to access the plurality of attributes on the interface mechanism by delegating the plurality of methods on the adapter to the plurality of methods on the interface mechanism; and signal bearing media bearing the framework mechanism.

16. The program product of claim 15 wherein the signal bearing media comprises recordable media.

17. The program product of claim 15 wherein the signal bearing media comprises transmission media.

18. The program product of claim 15 wherein the framework mechanism further includes at least one extensible item that may be dynamically extended by adding at least one extension that defines domain-specific behavior for the corresponding extensible item.

19. A program product comprising:

an object oriented framework mechanism including an interface mechanism that defines a plurality of attributes corresponding to a plurality of stored data in a non-object oriented persistent datastore, the interface mechanism further defining a plurality of methods to access the plurality of stored data, the framework mechanism further including a mechanism for invoking a method on an object at a different level in the framework mechanism if no object at the current level implements the method; and signal bearing media bearing the framework mechanism.

20. The program product of claim 19 wherein the signal bearing media comprises recordable media.

21. The program product of claim 19 wherein the signal bearing media comprises transmission media.

22. The program product of claim 19 wherein the framework mechanism further includes at least one extensible item that may be dynamically extended by adding at least one extension that defines domain-specific behavior for the corresponding extensible item.

23. A program product comprising:

(A) an object oriented framework mechanism including:

a common interface defining at least one attribute corresponding to a plurality of data stored in a non-object oriented persistent datastore;

at least one extensible item that may be dynamically extended by adding at least one extension that defines domain-specific behavior for the corresponding extensible item;

at least one user-defined extension to the extensible item that references the common interface and provides a plurality of methods to access the at least one attribute on the common interface;

an adapter corresponding to the user-defined extension, the adapter providing an interface that defines a plurality of methods to access the at least one attribute on the common interface by delegating the plurality of methods to the plurality of methods on the extension; and (B) signal bearing media bearing the framework mechanism.

24. The program product of claim 23 wherein the signal bearing media comprises recordable media.

25. The program product of claim 23 wherein the signal bearing media comprises transmission media.

* * * * *